Patented Aug. 5, 1947

2,425,280

UNITED STATES PATENT OFFICE 2,425,280

PRODUCTION OF RIBOFLAVIN BY BUTYL ALCOHOL PRODUCING BACTERIA

Richard J. Hickey, Terre Haute, Ind., assignor to Commercial Solvents Corporation, Terre Haute, Ind., a corporation of Maryland No Drawing. Application June 27, 1945, Serial No. 601,928

4 Claims. (Cl. 195—44)

This invention relates to the production of vitamins, and more specifically to a method for enhancing the production of riboflavin produced by the propagation of butyl alcohol producing organisms on nutrient media.

The synthesis of riboflavin by butyl alcohol producing bacteria along with solvents such as butyl alcohol, acetone, etc., has been disclosed in U. S. Patent No. 2,202,161 to Carl S. Miner. A method for increasing the production of riboflavin by the action of butyl alcohol producing bacteria on a carbohydrate mash has been disclosed in U. S. Patent No. 2,326,425 by C. F. Arzberger. In accordance with the process of the last mentioned patent, carbohydrate mashes are fermented in such manner that the effective amounts of iron, nickel, cobalt, copper, lead and zinc present in the fermentation system are maintained sufficiently low to reduce the inhibitory effects of said metals on riboflavin synthesis. The illustrative method described in the Arzberger patent, for effecting the maintenance of a low concentration of inhibitory metals consists essentially of the utilization of precautions to prevent the introduction of inhibitory materials into the mash, for example, by the utilization of aluminum vessels, the careful control of sources of contamination such as steam, water, mashing constituents, etc.

In commercial fermentation processes, however, it is desirable to use iron or steel equipment wherever possible because of its cheapness, strength, availability, etc.

As brought out in the Arzberger patent, this practice results in a serious inhibition of the production of certain vitamins as described, especially riboflavin, and necessitates the observance of the troublesome precautions prescribed in that patent.

I have now found that high yields of riboflavin can be obtained by the action of butyl alcohol producing bacteria on nutrient media initially containing iron in concentrations greatly in excess of the concentrations known to exert an inhibitory effect on riboflavin synthesis, and that the synthesis may be carried out in iron or steel equipment and without resort to the iron excluding precautions heretofore deemed necessary, according to my invention in which an iron complexing agent of the class of 2,2'-bipyridine is added to the fermentation liquors during the synthesis of riboflavin, particularly in the early stages of fermentation.

The 2,2'-bipyridine compound utilizable as iron suppressing agent according to my invention has the following formula:

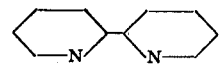

In carrying out the process of my invention, a nutrient medium or mash is prepared in the usual way, utilizing any of the well known starchy carbohydrate sources for example, the cereal grains, for the fermentation with the butyl alcohol producing types of bacteria.

The mash is sterilized in the usual way and the required quantity of 2,2'-bipyridine is added, or the 2,2'-bipyridine may be added before sterilization, if desired. The mash is then inoculated with a butyl alcohol producing organism, for example, *Clostridium acetobutylicum* (Weizmann), or the like.

For the successful production of riboflavin in such media, a certain minimum of iron is essential, and this minimum appears to be in the range of 1 to 2 micrograms per ml (i. e., 1 to 2 parts per million). Quantities above this figure, however, tend to inhibit the synthesis of riboflavin. Accordingly, the quantity of 2,2'-bipyridine added initially must be regulated so as to permit the retention of the residual free or ionized iron concentration described. If, then, the fermentation is carried out under conditions conducive to iron pickup, as for example, in iron fermenters, additional 2,2'-bipyridine will be added at intervals to maintain the iron concentration at or near the minimum concentration desired, the optimum amount necessary being in the neighborhood of about 5 to 10 parts per million of 2,2'- bipyridine per part per million of dissolved iron present.

The mash is then fermented in the usual way, over a period usually of about 2 days, and the solvents and riboflavin are recovered according to known processes.

The following specific examples will serve to illustrate the mode of carrying out my invention.

EXAMPLE I

Fourteen parts of ground, whole corn, analysing 12.7% moisture and 72.4% starch (dry basis) were placed in a series of fermentation vessels with 200 parts of water, steamed for one hour and sterilized for one hour with steam at 15 pounds per square inch steam pressure. The mash thus produced was then inoculated with 2½% of a fourth generation culture of *Clostridium acetobutylicum* developed on 7% whole corn mash. To some of these mixtures, varying quantities of soluble iron were added and some of these were treated with varying quantities of 2,2'-bipyridine as indicated in the following table.

The mashes were found to contain initially about 1μ/ml. of dissolved iron, contributed by the mashing ingredients, and the total iron present was this initial iron plus the added quantity indicated. The mashes were then fermented for forty-four hours at 37° C. with the results indicated in the table below.

*Table*

| Added Fe | Added 2,2'-Bipyridine | Free Iron Found in Solution | Solvents | Riboflavin Produced | Total Solids |
|---|---|---|---|---|---|
| μg./ml. | μg./ml. | μg./ml. | μg./ml. | μg./ml. | g./100 ml. |
| 0 | 0 | 1.1 | 15.0 | 13.8 | 1.93 |
|  | 0 | 1.1 | 14.5 | 16.0 | 2.41 |
|  | 3.2 | 0.9 | 14.5 | 11.5 | 2.62 |
|  | 6.3 | 0.8 | 13.5 | 15.0 | 2.28 |
|  | ¹12.6 | 0.9 | 10.0 | 14.8 | 3.32 |
|  | 19.0 | 0.9 | 6.5 | 11.3 | 4.26 |
|  | 25.3 | 0.7 | 0.5 | 3.5 | 6.00 |
|  | 31.6 | 0.95 | 0 | 1.3 | 6.36 |
| 1 | 0 | 1.5 | 14.5 | 2.5 | 2.16 |
|  | 3.2 | 1.5 | 15.0 | 2.1 | 2.16 |
|  | 6.3 | 1.19 | 15.0 | 5.5 | 2.24 |
|  | 12.6 | 1.4 | 14.5 | 10.6 | 2.04 |
|  | 19.0 | 1.1 | 13.5 | 15.0 | 2.16 |
|  | ¹22.1 | 1.1 | 11.0 | 16.0 | 3.28 |
|  | 25.3 | 1.3 | 8.5 | 12.8 | 3.80 |
|  | 28.4 | 1.0 | 4.0 | 7.5 | 4.80 |
|  | 31.6 | 0.8 | 0.5 | 3.3 | 5.76 |
|  | 37.9 | 0.8 | 0 | 1.9 | 6.40 |
| 2 | 0 | 1.5 | 13.5 | 0.5 | 2.28 |
|  | 6.3 | 1.5 | 15.5 | 0.8 | 2.28 |
|  | 12.6 | 1.8 | 15.5 | 2.0 | 2.28 |
|  | 19.0 | 1.7 | 15.0 | 5.3 | 2.00 |
|  | 25.3 | 1.4 | 14.5 | 13.4 | 2.04 |
|  | 28.4 | 2.0 | 13.5 | 12.5 | 2.16 |
|  | ¹31.6 | 1.9 | 10.0 | 12.3 | 3.40 |
|  | 34.8 | 2.3 | 9.5 | 14.5 | 3.36 |
|  | 37.9 | 3.3 | 8.0 | 13.9 | 3.36 |
|  | 44.2 | 2.3 | 2.0 | 3.0 | 5.92 |
| 4 | 0 | 4.2 | 15.0 | 0.6 | 2.04 |
|  | 12.6 | 4.1 | 15.5 | 0.5 | 2.04 |
|  | 19.0 | 3.9 | 15.5 | 0.6 | 2.08 |
|  | 25.3 | 4.2 | 16.5 | 0.65 | 2.20 |
|  | 31.6 | 3.9 | 16.5 | 0.6 | 2.04 |
|  | 37.9 | 3.8 | 15.5 | 2.5 | 2.00 |
|  | 44.2 | 3.3 | 15.5 | 11.6 | 2.32 |
|  | ¹50.6 | 3.5 | 13.0 | 14.2 | 2.88 |
|  | 56.9 | 3.0 | 5.0 | 5.4 | 4.28 |
|  | 63.2 | 3.4 | 1.5 | 2.4 | 5.92 |

¹ Lowest level of 2,2'-bipyridine at which significant suppression of fermentation occurred.

It is evident from the table that too great an excess of 2,2'-bipyridine is harmful to both riboflavin production and to the production of solvents. I have found that a quantity of 2,2'-bipyridine of approximately 6 to 12 parts per million of 2,2'-bipyridine per part per million iron in excess of 1 ppm. or about 3 mols of bipyridine per mol % iron present is apparently optimum, and care should be taken not to permit an appreciable quantity of uncombined 2,2'-bipyridine to be present in the solution during fermentation.

EXAMPLE II

A series of fermentation tests similar to those described in Example I was run using a different strain of *Clostridium acetobutylicum* as the inoculum. The mash consisted of 7% ground whole corn, which was steamed for one hour, and sterilized for one hour with steam at 15 pounds per square inch steam pressure. The mash, which initially contained about 1.9 P. P. M. iron, was then inoculated with 2% of a fourth generation culture of *Clostridium acetobutylicum*.

To one group of this series, iron was added, to another group, no iron was added. To all of both series, except a control in each case, quantities of 2,2'-bipyridine were added in the amounts indicated in the table given below. All the tests were incubated for 44 hours at 37° C. with the results indicated.

*Table*

| Iron Added | Added 2,2'-Bipyridine | Iron Found in Solution | Riboflavin Produced | Total Solids |
|---|---|---|---|---|
| μg./ml. | μg./ml. | μg./ml. | μg./ml. | g./100 ml. |
| 0 | 0 | 1.9 | 8 | 2.02 |
|  | 3.2 | 1.6 | 10 | 1.98 |
|  | 6.3 | 1.5 | 17 | 2.04 |
|  | 12.6 | 1.3 | 21 | 1.96 |
|  | 18.9 | 1.3 | 27.5 | 3.40 |
|  | 25.2 | 1.3 | 30 | 3.52 |
|  | 31.5 | 1.0 | 13 | 5.16 |
| 2 | 0 | 2.9 | 1.5 | 1.98 |
|  | 6.3 | 2.8 | 1.0 | 2.04 |
|  | 12.6 | 3.2 | 1.5 | 2.08 |
|  | 18.9 | 2.3 | 9.0 | 2.12 |
|  | 25.2 | 2.7 | 18.8 | 1.88 |
|  | 31.5 | 2.3 | 25 | 1.84 |
|  | 37.9 | 2.3 | 24 | 3.02 |
|  | 44.2 | 2.2 | 10 | 4.76 |

EXAMPLE III

A series of test media was prepared as described in Example I and each was inoculated with 1% of a third generation culture of *Clostridium acetobutylicum* developed on 7% whole corn mash. The mash was found to contain about 1.7 P. P. M. iron. To some of the media so prepared quantities of soluble iron were added, to others no iron was added. These media, with the exception of controls were treated with varying quantities of 2,2'-bipyridine as indicated in the table below, and all were incubated for 44 hours at 37° C. with the results indicated in the table below.

*Table*

| Added Iron | Added 2,2'-Bipyridine | Iron Found | Riboflavin Found | Solids | Riboflavin |
|---|---|---|---|---|---|
| μg./ml. | μg./ml. | μg./ml. | μg./ml. | g./100 ml. | μg./g. |
| 0 | 0 | 1.7 | 12.8 | 1.93 | 664 |
|  | 0 | 1.9 | 8.4 | 2.24 | 375 |
|  | 1.26 | 1.6 | 8.7 | 2.27 | 383 |
|  | 3.16 | 1.7 | 8.5 | 2.08 | 408 |
|  | 6.32 | 1.5 | 10.0 | 2.21 | 452 |
| 1 | 0 | 2.0 | 1.4 | 2.49 | 56 |
|  | 3.2 | 2.9 | 1.5 | 2.32 | 64 |
|  | 6.3 | 2.2 | 3.0 | 1.97 | 152 |
|  | 12.6 | 2.2 | 7.3 | 2.16 | 338 |
|  | 19.0 | 3.5 | 11.5 | 2.32 | 496 |
|  | 25.3 | 1.6 | 12.8 | 3.38 | 379 |
|  | 31.5 | 2.4 | 2.1 | 5.40 | 39 |
|  | 37.8 | 2.9 | 0 | 6.98 | ------ |
| 2 | 0 | 3.2 | 0.6 | 2.05 | 29 |
|  | 6.3 | 3.0 | 0.8 | 2.28 | 35 |
|  | 12.6 | 2.9 | 1.1 | 2.10 | 52 |
|  | 19.0 | 2.8 | 4.5 | 2.25 | 120 |
|  | 25.3 | 2.7 | 9.6 | 2.01 | 478 |
|  | 31.5 | 2.4 | 13.6 | 2.80 | 486 |
|  | 37.8 | 2.7 | 2.0 | 5.32 | 38 |
|  | 44.1 | 2.2 | 0 | 6.24 | ------ |

EXAMPLE IV

This example indicates the inhibiting effect on riboflavin synthesis of the presence of metallic iron in contact with the culture medium, and the suppression of this inhibition by the addition of 2,2'-bipyridine.

A series of fermentation media was prepared consisting of 7% ground whole corn in 700 parts of water. The mash was cooked and sterilized as described in Example I, and the series inoculated, each with 2% of a fourth generation culture of *Clostridium acetobutylicum* developed on 7% corn mash. Iron strips were placed in contact with each of the series with the exception of two control tests, each strip being equal in weight to 7 parts of water, and the relative surface thus exposed being approximately twice that exposed in a 50,000 gallon fermenter.

All members of the series were then incubated for 44 hours at 37° C. with the results indicated in the table below.

Table

| 2,2'-Bipyridine Added | Final Volume | Iron Loss from strip | Iron Found | Solvents Produced | Riboflavin Produced |
|---|---|---|---|---|---|
| µg./ml. | | mg. | µg./ml. | g./l. | µg./ml. |
| 0 | 680 | ------ | 0.9 | 14.8 | 8.25 |
| 9.7 | 650 | ------ | 0.8 | 11.6 | 8.0 |
| 0 | 640 | 2.6 | 3.8 | 15.8 | 0.75 |
| 4.7 | 670 | 2.1 | 3.5 | 15.8 | 0.75 |
| 9.6 | 660 | 3.0 | 2.4 | 15.6 | 0.65 |
| 19.5 | 650 | 5.0 | 4.7 | 15.6 | 0.60 |
| 29.2 | 650 | 1.6 | 2.0 | 13.6 | 4.75 |
| 47.8 | 660 | 2.9 | 3.4 | 3.8 | 0.75 |

While the above describes the preferred embodiments of my invention, it will be understood that departures may be made therefrom within the scope of the specification and claims.

What is claimed is:

1. In a method for increasing the riboflavin synthesis of butyl alcohol producing cultures when propagated on carbohydrate-containing nutrient media, containing iron in quantities sufficient to inhibit riboflavin synthesis, the step which comprises adding 2,2'-bipyridine thereto in quantities sufficient to inactivate the preponderant proportion of iron present in solution, but insufficient to inhibit traces of iron below about 1 part per million.

2. In a method for increasing the riboflavin production of *Clostridium acetobutylicum* when propagated on starch-containing nutrient media, containing iron in quantities sufficient to inhibit riboflavin synthesis, the step which comprises adding 2,2'-bipyridine thereto in quantities sufficient to inactivate all the iron present in the solution in excess of about 1 part per million.

3. In a method for increasing the riboflavin production of *Clostridium acetobutylicum* when propagated on a cereal grain mash, containing iron in quantities sufficient to inhibit riboflavin synthesis, the step which comprises adding 2,2'-bipyridine thereto in quantities sufficient to inactivate all the iron present in the solution in excess of about 1 part per million.

4. In a method for increasing the riboflavin synthesis of butyl alcohol producing cultures when propagated on carbohydrate-containing nutrient media, containing iron in quantities sufficient to inhibit riboflavin synthesis, the step which comprises adding 2,2'-bipyridine thereto in a quantity equal to about 5 to 10 parts per million per part per million of dissolved iron in the medium sufficient to reduce the iron concentration of the solution just below the quantity which seriously inhibits riboflavin synthesis, but insufficient to remove the last traces of iron from the solution.

RICHARD J. HICKEY.

REFERENCES CITED

The following references are of record in the file of this patent:

UNITED STATES PATENTS

| Number | Name | Date |
|---|---|---|
| 2,326,425 | Arzberger | Aug. 10, 1943 |

OTHER REFERENCES

Chemical Abstracts 28: 6078 (7), Complex salts of 2,2-bipyridiyl with bivalent iron, Jaeger et al., Proc. Acad. Sci., Amsterdam 37, 333–6 (1934).

Chemical Abstracts 31: 3370 (1), Haufe et al., Z Anorg. Allgem. Chem. 230, 160–75 (1936).

Chemical Abstracts 32: 1376 (9), Ignatieff, J. Soc. Chem. Ind. 56, 407–10T (1937).

Chemical Abstracts 30: 7078 (5), Jaeger et al., Z Anorg. Allgem. Chem. 227–327 (1936).